Aug. 20, 1940.    M. E. PASCHKE    2,212,450
NONSKID DEVICE
Filed Feb. 21, 1939
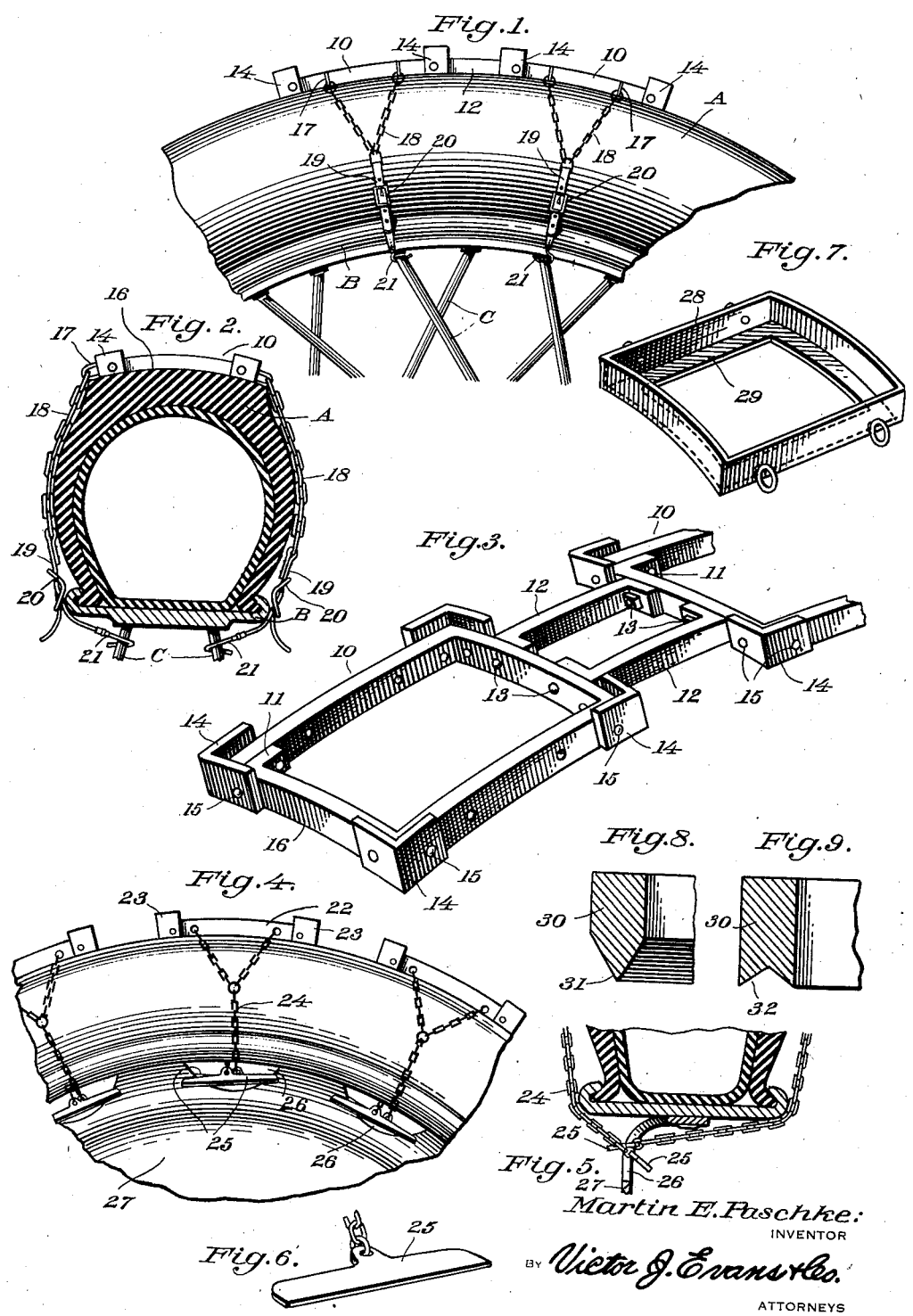

Patented Aug. 20, 1940

2,212,450

UNITED STATES PATENT OFFICE 2,212,450

NONSKID DEVICE

Martin E. Paschke, Williamsville, N. Y.

Application February 21, 1939, Serial No. 257,751

1 Claim. (Cl. 152—227)

The invention relates to a nonskid device and more especially to a nonskid attachment for vehicle tires of pneumatic or cushion type.

The primary object of the invention is the provision of a device of this character, wherein calks are disposed at the outer periphery of the tire casing and are held fast to the tire so that when traveling over icy, wet or slippery surfaces proper traction will be had and without the slipping of the wheel wearing the tire, or skidding, creeping or the like.

Another object of the invention is the provision of a device of this character, wherein the units thereof are of a determined construction to assure calking action upon a surface for preventing skidding or the spinning of the tire and these units are adaptable for connection with the vehicle wheel wearing a tire so that such units will be held in place and will enable positive tread action on slippery surfaces, the units being particularly adaptable to pneumatic tires or cushion tires as used on motor vehicles or the like.

A further object of the invention is the provision of a device of this character, wherein the construction thereof is such as to enable it to be fastened to a wire spoked wheel, a disk wheel or a wood spoked wheel, and in fact other types of wheels now commonly employed in the equipment of a motor vehicle or the like.

A still further object of the invention is the provision of a device of this character, which assures positive gripping action, avoiding skidding or slippage of the tires upon wet or slippery surfaces, being simple in its make-up, thoroughly reliable and efficient in operation, strong, durable, and inexpensive to manufacture.

With these and other objects in view, the invention consists in the features of construction, combination and arrangement of parts as will be hereinafter more fully described, illustrated in the accompanying drawing, which discloses the preferred and modified forms of embodiment of the invention and pointed out in the claim hereunto appended.

In the accompanying drawing:

Figure 1 is a fragmentary side elevation of a pneumatic tired vehicle wheel showing a unit of the non-skid device constructed in accordance with the invention applied thereto.

Figure 2 is a vertical transverse sectional view through the wheel and tire showing the unit in end elevation.

Figure 3 is a fragmentary perspective view of the unit.

Figure 4 is a view similar to Figure 1 showing a slight modification.

Figure 5 is a fragmentary vertical transverse sectional view thereof.

Figure 6 is a perspective view of one of the anchoring pieces for the device.

Figure 7 is a perspective view of a further modified form of unit.

Figures 8 and 9 are fragmentary elevations partly in section showing further modifications.

Similar reference characters indicate corresponding parts throughout the several views in the drawing.

Referring to the drawing in detail, particularly Figures 1 to 3, inclusive, A designates generally a portion of a pneumatic tire of the conventional type mounted upon a vehicle wheel, a portion of the wheel being indicated at B and its wire spokes at C, respectively. Adapted to be applied to the tire and wheel is the non-skid device constituting the present invention and hereinafter fully described.

The nonskid device comprises a pair of spaced frames 10, each made from a metal bar bent into frame shape with its meeting ends united at 11, and between these frames 10 are coupling straps or members 12, being bolted at 13 to the respective frames, while at opposite corners of and exteriorly to the frames are angle pieces 14, these constituting calks with working edges protruded beyond the frames with which the same are joined by fasteners 15. These frames 10 with the coupling straps or members 12 and the calks 14 constitute one of the units of the device. The frames 10 are bowed correspondingly to the lay of the tread 16 of the outer shoe or casing of the tire A.

In opposite sides of the frames 10 of each unit are fixed staples 17 for loose connection therewith of branch chains 18, pairs being loosely connected to adjusting straps 19, the adjusting medium being the buckles 20. These straps 19 have connected therewith anchoring hooks 21 adapted for engaging about the spokes C of the wheel B, the anchorage being had at opposite sides of the said wheel and in this manner the unit including the parts above mentioned will be fastened at the tread of the casing or shoe of the tire A and held for nonskidding when the wheel tire A is traveling over wet or slippery surfaces.

In Figures 4, 5 and 6 of the drawing there is shown a modification wherein each unit is a frame 22 having the corner calks 23 while attached to each side of the frame 22 is a chain connection 24 with a swingable anchor 25. It is of course understood that the connections are disposed in the wearing of the unit frame 22 at opposite sides of the tire and the anchors are passed reversely through a clearance 26 in a disk wheel, a portion being indicated at 27, and in this manner the unit frame 22 will be held at the tread of the tire for nonskid purposes. These anchors 25 are swingable from a centrally connected point so that they can be passed through the clearance 26 into straddling relation thereto for holdfast purposes, as will be apparent in Figure 5 of the drawing.

In Figure 7 of the drawing there is shown a further modification of unit wherein the frame constituting said unit is of cross sectional angle formation of substantially L shape presenting an outstanding flange 28 at right angles to the lay of the base flange 29 which is adapted to be seated against the tread of the tire shoe or casing in the application of said unit and the anchoring of the same. These flanges 28, which are at opposite sides and ends of the frame constituting the unit just referred to, effect end and side calks, being unbroken and continue about the periphery of said unit.

In Figure 8 of the drawing the flange 30 at the calking side is formed with a knife edge 31 while in Figure 9 of the drawing this calking edge is of double knife edge formation, as at 32, so that a biting action of the calks into a slippery surface will be had and in this way eliminating skidding in the use of the nonskid device. When the knife edge 31 or 32 are present on the unit, the angle pieces 14 can be dispensed with or these angle pieces can be edged similarly to the edges 31 and 32 for biting purposes. Where the calks are eliminated, the edges 31 and 32 are formed in the frames for the device.

What is claimed is:

A nonskid device for a tired wheel, comprising four-sided vertically walled centrally opened frames forming calks for positioning upon a tire of the wheel and having a curvature following the tread of said tire, the walls of the frames being edgewise to the tread of said tire, corner angle pieces riveted exteriorly to the frames at the corners thereof and projected outwardly beyond said frames, means for fastening the frames in place upon the tire and having two-point connection with each frame at opposite sides thereof, the two-point connections being contiguous to the ends of said frames, and rigid coupling straps joining frames in adjacent relation to each other for their arrangement in pairs circumferentially to the said tire.

MARTIN E. PASCHKE.